United States Patent
Hauschel et al.

(10) Patent No.: US 7,786,238 B2
(45) Date of Patent: Aug. 31, 2010

(54) CATIONIC STARCH GRAFT COPOLYMERS AND NOVEL PROCESS FOR THE PREPARATION OF CATIONIC STARCH GRAFT COPOLYMERS

(75) Inventors: Bernd Hauschel, Leverkusen (DE); Bernd Thiele, Odenthal (DE); Thomas Hübbe, Köln (DE); Bernhard Jansen, Köln (DE)

(73) Assignee: Kemira Oyj (FI)

( * ) Notice: Subject to any disclaimer, the term of this patent is extended or adjusted under 35 U.S.C. 154(b) by 1124 days.

(21) Appl. No.: 10/788,064

(22) Filed: Feb. 26, 2004

(65) Prior Publication Data
US 2004/0170596 A1 Sep. 2, 2004

(30) Foreign Application Priority Data
Feb. 28, 2003 (DE) ................. 103 08 753

(51) Int. Cl.
*C08F 31/00* (2006.01)
*C08F 8/30* (2006.01)
*C08L 3/00* (2006.01)

(52) U.S. Cl. ............... 527/312; 527/313; 527/314; 524/47

(58) Field of Classification Search .............. 524/47; 527/312, 313, 314
See application file for complete search history.

(56) References Cited

U.S. PATENT DOCUMENTS

| | | | | |
|---|---|---|---|---|
| 3,325,346 A * | 6/1967 | Osborg | ............... | 162/164.6 |
| 3,984,361 A | 10/1976 | Gugliemelli et al. | . | 260/17.4 GC |
| 4,028,290 A * | 6/1977 | Reid | ............... | 524/768 |
| 4,278,573 A | 7/1981 | Tessler | ............... | 260/17.4 GC |
| 4,330,365 A | 5/1982 | Tessler | ............... | 162/168 NA |
| 4,400,496 A | 8/1983 | Butler et al. | ............... | 527/312 |
| 4,605,702 A | 8/1986 | Guerro et al. | ............... | 525/154 |
| 4,684,708 A * | 8/1987 | Deets et al. | ............... | 527/312 |
| 4,744,864 A | 5/1988 | Deets et al. | ............... | 162/164.6 |
| 4,880,497 A * | 11/1989 | Pfohl et al. | ............... | 162/135 |
| 4,978,427 A * | 12/1990 | Pfohl et al. | ............... | 162/168.2 |
| 5,116,890 A | 5/1992 | Floyd et al. | ............... | 524/50 |
| 5,116,927 A | 5/1992 | Floyd et al. | ............... | 527/300 |
| 5,886,124 A | 3/1999 | Kightlinger et al. | ........ | 527/312 |
| 6,090,871 A * | 7/2000 | Reiners et al. | ............... | 524/27 |
| 6,235,835 B1 * | 5/2001 | Niessner et al. | ........ | 525/54.24 |

FOREIGN PATENT DOCUMENTS

| | | |
|---|---|---|
| EP | 147 380 | 7/1985 |
| EP | 147380 A2 * | 7/1985 |
| EP | 194.987 | 3/1986 |
| EP | 194987 A * | 9/1986 |
| EP | 281 395 | 9/1988 |
| EP | 405 917 | 1/1991 |
| EP | 582166 | 7/1993 |
| WO | 98/28722 | 7/1998 |

* cited by examiner

*Primary Examiner*—David Wu
*Assistant Examiner*—Michael M Bernshteyn
(74) *Attorney, Agent, or Firm*—Cantor Colburn LLP

(57) ABSTRACT

Cationic starch graft copolymer composed of the monomers a) to d)
a) 20-80% by weight of acrylamide, methacrylamide or mixtures thereof,
b) 3-20% by weight of at least one basic or cationic vinyl monomer,
c) 0.005-1.5% by weight of at least one bifunctional or higher-functional crosslinking agent,
d) 0-10% by weight of at least one nonionic or anionic vinyl monomer which differs from the monomers mentioned under a) to c)
and a grafting base e)
e) 15-70% by weight of at least one starch or one starch derivative,
the sum of a) to e) being 100% by weight.

6 Claims, No Drawings

CATIONIC STARCH GRAFT COPOLYMERS AND NOVEL PROCESS FOR THE PREPARATION OF CATIONIC STARCH GRAFT COPOLYMERS

The present invention relates to cationic starch graft copolymers which are suitable for increasing the dry strength of paper, their use and their preparation.

The dry strength of paper covers various strength parameters which are determined on the dry paper, such as dry tensile strength, bursting strength, cleavage strength or strength in the z direction, stiffness, buckling resistance and surface strength (cf. "Dry Strength Additives", Ed. W. F. Reynolds, TAPPI Press 1980, Atlanta). For increasing the dry strength, certain additives can be added to paper. The dry strength is determined primarily by hydrogen bridges within the paper sheet, in addition to the natural strength of the cellulose fibres themselves. Polymeric, hydrophilic additives which can form hydrogen bridges with the cellulose fibres and thus increase the contact area between the cellulose fibres have therefore proved useful. Typical examples of these are starch, galactomannans, polyacrylamides, carboxymethylcellulose and polyvinyl alcohol.

Additives for increasing the dry strength, i.e. dry strength agents, can be added to the paper pulp and/or applied to the surface of the paper. For use in the pulp, either cationic, self-retaining polymers are employed or anionic or amphoteric polymers are used in combination with a cationic fixing agent. In the case of surface use, the charge plays no role for the fixing, so that virtually uncharged polymers, such as polyvinyl alcohol, can also be used here. Starches and galactomannans which are used as dry strength agents in the pulp are usually cationically modified. Polyacrylamides are used in anionic, amphoteric or cationic form, amphoteric or anionic polyacrylamides usually being combined with affixing agent when used in the pulp in order to achieve good retention in the paper.

U.S. Pat. No. 4,400,496 describes graft polymers based on starch and acrylamide, starch serving as the grafting base and the grafts either consisting only of acrylamide, i.e. being nonionic, or being composed of acrylamide and acrylic acid, i.e. being anionic. If they are added as dry strength agents to the paper pulp, such products must be combined with a fixing agent in order to ensure sufficient retention. EP-A 194 987 describes cationic starch graft polymers as paper dry strength agents, starch being used as grafting base and the grafts consisting of cationic polyacrylamide fragments. This is achieved by grafting on acrylamide together with a cationic vinyl monomer. The products described can be used without a fixing agent in the paper pulp since they have sufficient intrinsic retention owing to the cationic charge. A significant increase in the dry breaking strength is achieved thereby.

It has now surprisingly been found that cationic starch graft polymers whose grafts preferably predominantly comprise acrylamide and/or methacrylamide can be further improved in their action as dry strength agents if crosslinking agents having a functionality of 2 or higher are concomitantly used during the graft polymerization of acrylamide or methacrylamide, cationic vinyl monomer and optionally further monofunctional vinyl monomers.

The present invention therefore relates to cationic starch graft polymers comprising the monomers a) to d)
a) 20-80% by weight of acrylamide, methacrylamide or mixtures thereof,
b) 3-20% by weight of at least one basic or cationic vinyl monomer,
c) 0.005-1.5% by weight of at least one bifunctional or higher-functional crosslinking agent,
d) 0-10% by weight of at least one nonionic or anionic vinyl monomer which differs from the monomers mentioned under a) to c)

and a grafting base e)
e) 15-70% by weight of at least one starch or one starch derivative, the sum of a) to e) being 100% by weight.

The starch graft polymers according to the invention are obtainable by free radical polymerization of monomers a) to d) in the presence of the grafting base e).

Acrylamide, methacrylamide and any desired mixtures of these two monomers are suitable as monomers mentioned under a). Pure acrylamide is preferably used.

Vinyl compounds which have a double bond capable of free radical polymerization and which either carry a permanently cationic charge, e.g. in the form of an ammonium group, or contain a basic group which is present in at least partly protonated form even under weakly acidic (pH 2.5-6) conditions are suitable as monomers mentioned under b). For example, N,N-dialkylaminoalkyl acrylates or methacrylates or N,N-dialkylaminoalkylacrylamides or methacrylamides and the respective quaternization products thereof can be used. Specific examples of these are N,N-dimethylaminoethyl acrylate, N,N-dimethylaminoethyl methacrylate, N,N-diethylaminoethyl acrylate, N,N-diethylaminoethyl, methacrylate, N,N-dimethylaminopropylacrylamide, N,N-dimethylaminopropylmethacrylamide and the corresponding quaternary ammonium salts which can be prepared from the abovementioned compounds, for example by reaction with customary quaternizing reagents, such as methyl chloride, dimethyl sulphate, epichlorohydrin or benzyl chloride, such as, for example, 2-(acryloyloxy)ethyltrimethylammonium chloride, 2-(methacryloyloxy)ethyltrimethylammonium chloride, 3-(acrylamido)propyltrimethylammonium chloride, 3-(methacrylamidopropyl)trimethylammonium chloride, 2-(acryloyloxy)ethylbenzyldlmethylammonium chloride and 2-(methacryloyloxy) ethylbenzyldimethylammonium chloride. Further examples of suitable monomers mentioned under b) are vinylpyridine and diallyldimethylammonium chloride. Permanently cationic monomers are preferably used. 2-(Acryloyloxy)ethyltrimethylammonium chloride, 2-(methacryloyloxy)ethyltrimethylammonium chloride and diallyldimethylammonium chloride are particularly preferred here.

For example, those having a water solubility of at least 3 g/l at 23° C. are suitable monomers mentioned under c), for example divinyl compounds, such as N,N'-methylenebisacrylamide, ethylene glycol diacrylate and ethylene glycol dimethacrylate. N,N'-Methylenebisacrylamide is preferably used.

Nonionic or anionic vinyl compounds, such as, for example, styrene, acrylic esters, methacrylic esters, acrylonitrile, methacrylonitrile, vinyl acetate, vinyl propionate, N-vinylformamide, hydroxyethyl acrylate or methacrylate, and furthermore esters of acrylic acid or methacrylic acid which can be obtained by reaction with at least 2 equivalents of ethylene oxide, and acrylic acid, methacrylic acid, itaconic acid, maleic anhydride, vinylsulphonic acid and styrenesulphonic acid, are suitable as monomers mentioned under d). However, the amount of the monomers mentioned under d) is preferably <3% by weight, based on the sum of a) to e).

If an anionic monomer mentioned under d) is used, the amount in relation to the amount of the cationic monomer under b) is chosen so that not more than 0.66 mol of anionic monomer, based on 1 mol of cationic monomer, is used. Exclusively products having an excess cationic charge are thus obtained.

Preferably, starches based on potato starch, rice starch, wheat starch, maize starch or tapioca starch are suitable as starches mentioned under e). Usually, starches whose molecular weights have already been reduced by partial degradation and/or which have been obtained by derivatization are preferably used instead of natural starches. Furthermore, starches for which both modification steps have been combined, i.e. which have been partially degraded and additionally derivatized, are suitable. Typical methods for starch degradation are, for example, enzymatic, oxidative, thermal or hydrolytic treatment. Examples of suitable starch derivatives are hydroxyethyl starch or cationic starch. Cationic starch is understood as meaning in general starch ethers which contain quaternary ammonium groups. In the context of the present invention, hydroxyethyl starch and cationic starch are preferred, and predegraded, cationic starches, each having a degree of substitution DS of >0.01, are particularly preferred.

The polymerization is usually carried out in an aqueous medium in the neutral to acidic pH range, preferably in the pH range 2.5-6. The pH can be adjusted to a suitable value before the beginning of the polymerization by adding small amounts of mineral acids or organic acids, such as, for example, hydrochloric acid, sulphuric acid, phosphoric acid, formic acid or acetic acid. As a rule, the starch is initially introduced completely in aqueous suspension or solution and the other monomers are either added in the batch process or in the feed process and reacted in a free radical polymerization by means of suitable initiators. EP-A 194 987 describes, as a typical process, initially introducing the glutenized starch, and nonionic and cationic monomer in the form of a mixture and initiating the polymerization by adding an initiator and carrying out said polymerization.

The invention therefore also relates to a process for the preparation of the starch graft polymer according to the invention, which is characterized in that the components a) to e) are subjected to free radical polymerization in water in the presence of free radical initiators.

The invention furthermore relates to a process for the preparation of a cationic starch graft polymer, characterized in that the monomers a) to d)

a) 20-80% by weight of acrylamide, methacrylamide or mixtures thereof
b) 3-20% by weight of at least one basic or cationic vinyl monomer
c) 0-1.5% by weight of at least one bifunctional or higher-functional crosslinking agent
d) 0-10% by weight of at least one nonionic or anionic vinyl monomer which differs from the monomers mentioned under a) to c)

are subjected to free radical polymerization in the presence of
e) 15-70% by weight of at least one starch or one starch derivative, characterized in that, in a first step, the component e), as the grafting base, is subjected to free radical polymerization in water with at least 30% by weight of the total amount of the component b) and then, in a second step, the other components a), c), d) and the remaining amount of b) are subjected to free radical polymerization in the presence of the reaction mixture formed in the first step, and the sum of a) to e) is 100% by weight.

The invention also relates to cationic starch graft polymers obtainable by this process.

This two-stage process is preferably carried out in such a way that, in a first step, the vinyl monomer mentioned under b) is subjected to free radical polymerization by addition of an initiator in the presence of the component mentioned under e), the reaction temperature being at least 70° C., the duration of polymerization being at least 15 min and the amount of initiator being at least 2.0% by weight, based on the total amount of the monomer mentioned under b); and, in a second step, the remaining monomers are reacted in the presence of the reaction mixture formed.

The starch initially introduced in water is preferably heated to a value above its glutenization temperature before the first polymerization step is started. The customary temperature range for both polymerization steps is 70-100° C. The temperature may also be higher if a pressure-resistant reactor under superatmospheric pressure is employed. The customary duration of polymerization for the first step is 0.25-1.5 h and that for the second step is 0.5-4 h. The monomers and initiators can in each case be added in one or in several portions over the duration of polymerization, or can also be metered in continuously. Polymerization is carried out in an inert gas atmosphere, e.g. under nitrogen.

Initiators used for the polymerization are in general free radical initiators, preferably peroxo or azo compounds. Examples of these are hydrogen peroxide, sodium, potassium and ammonium peroxodisulphate, di-tert-butyl peroxide, dibenzoyl peroxide, azobisisobutyronitrile, 2,2'-azobis(2-methylbutyronitrile), 2,2'-azobis(2,4-dimethylvaleronitrile) and 2,2'-azobis(2-amidinopropane) dihydrochloride. Preferred among these are initiators having a water solubility of >1% by weight at 23° C., such as, for example, hydrogen peroxide and potassium and ammonium peroxodisulphate.

Furthermore, so-called redox initiator systems, in which said free radical initiators are used together with a reducing agent, are suitable as initiators. Examples of suitable reducing agents are sodium sulphite, sodium pyrosulphite, sodium hydrogen sulphite, sodium dithionite, sodium formaldehyde sulphoxylate and ascorbic acid. In addition, said free radical initiators can also be combined with heavy metal salts, such as cerium (IV), manganese or iron salts to give a suitable redox system. Ternary initiator systems consisting of free radical initiator, reducing agent and heavy metal salt are furthermore suitable.

If a binary redox system comprising free radical initiator and reducing agent is used, the reducing agent is preferably initially introduced before the beginning of the polymerization. An amount of 2.0-4.5% by weight, based on the total amount of monomer b), of free radical initiator is preferably used for the first polymerization step.

In general, the reaction conditions are preferably chosen so that at least 50% by weight of the monomer b) are reacted during the first polymerization step of the two-stage process. The conversion at the end of the first step can be determined by the methods known to a person skilled in the art, such as, for example, HPLC or $^1$H-NMR spectroscopy.

During the entire preparation process, the reaction mixture is usually thoroughly mixed by means of suitable stirring or mixing units so that the added components are homogeneously distributed as rapidly as possible. After the end of the addition of the monomers and the initiator of the second polymerization step, the reaction mixture is usually allowed to continue reacting for some time in order to complete the polymerization. After this subsequent reaction time, a certain amount of initiator is preferably added again in order to polymerize as substantially as possible the residual monomers still present in the reaction mixture. After a further subsequent reaction time, the pH of the resulting polymer solution can be adjusted by adding suitable bases. A value in the range 4-7 is preferably established thereby, and preferred bases are alkali metal hydroxides and alkali metal acetates. Furthermore, buffer substances may also be added in order to stabilize the pH over the storage time.

The concentration of the graft polymer solutions prepared by the two-stage process is preferably 5-25% by weight and in particular 12-22% by weight. The viscosity of the resulting solutions is preferably <5 000 mPa.s measured at 23° C. by means of a rotational viscometer.

In order to increase the shelf-life of the resulting polymer solutions, a biocide may be added at the end of the preparation process in order to achieve effective protection from fungal and bacterial attack. Biocides based on isothiazolinones or benzoisothiazolinones, or formaldehyde-donating biocides, are preferably added for this purpose.

The cationic starch graft polymers according to the invention are suitable in principle for ensuring the dry strength of all customary papers, it being possible both to use them in the pulp, i.e. to add them to the paper stock prior to sheet formation, and to apply them to the surface of the paper web, for example by means of a size press or film press or by spraying.

The majority of the customary paper stock systems consist of fibres, mineral fillers and water. There are also filler-free stock systems. Suitable fibres in the context of the invention are all customary types, such as bleached and unbleached, wood-free and wood-containing, wastepaper-containing and deinked stocks. Examples of customary fillers are kaolin, natural or precipitated $CaCO_3$, talc and titanium dioxide.

In a preferred embodiment, the polymers according to the invention are used in the pulp and, owing to their cationic charge, are substantially absorbed onto the cellulose fibres. The polymers according to the invention can be used both in the acidic and in the neutral procedure. The customary added amounts (calculated as polymeric solid) are 0.05-2% by weight, based on dry paper stock. Optionally, the polymers according to the invention can also be combined with temporary or permanent wet strength agents, with the result that development of increased wet and dry strength is achieved. The polymers according to the invention are very suitable for combination with cationic wet strength agents. Examples of these are urea/ or melamine/formaldehyde resins, polyamine/ or polyamidoamine/epichlorohydrin resins, glyoxalated cationic polyacrylamides, as described, for example, in U.S. Pat. No. 4,605,702, and hydrophilized polyisocyanates, as described, for example, in EP-A 582 166/EP-A 944 886.

In a further preferred embodiment, the polymers according to the invention are applied to the surface of the paper web, usually by means of suitable application units, such as a size press or film press. The customary added amounts (calculated as polymeric solid) are 0.05-2% by weight, based on dry paper stock. In this application, the polymers according to the invention can be combined with other customary paper chemicals which are used in the surface, in particular with starches and surface sizes. Less suitable is the combination with anionic optical brighteners, since the brightener effect is reduced by the cationic polymer. When brighteners are concomitantly used, nonionic and/or cationic brighteners are preferably employed. Furthermore, the polymers according to the invention can also be combined with the temporary or permanent wet strength agents described above, also in the case of surface application, if it is also desired to increase the wet strength in addition to increasing the dry strength.

In addition to increasing the dry strength, i.e. the dry tensile strength, bursting strength, cleavage strength, stiffness and buckling resistance, the polymers according to the invention are also very suitable for reducing dusting and picking, which is advantageous for the printability in a number of customary printing processes. Furthermore, the dry strength agents according to the invention are suitable for use in pulp for improving the retention of fillers and of fines and for accelerating drainage. In addition, the dry strength agents according to the invention can advantageously be combined with the synthetic engine sizes alkylketene dimer (AKD) and alkenylsuccinic anhydride (ASA), since they promote the retention of these products when used in the pulp and can also act as so-called cationic promoters, i.e. can accelerate the reaction of AKD or ASA with the cellulose fibre.

Compared with the products frequently used for increasing the dry strength and based on glyoxalated polyacrylamides, the dry strength agents according to the invention have the advantage of a substantially increased shelf-life.

EXAMPLES

Preparation Examples (all stated percentages are % by weight, unless stated otherwise)

For all preparation examples, cationic potato starches whose molecular weight had been reduced were used. Specifically, the starches used had the following features with regard to the method of molecular weight reduction and degree of substitution with cationic groups:

|  | Method of reduction | Degree of substitution DS |
|---|---|---|
| Starch A | Oxidative | 0.018 |
| Starch B | Oxidative | 0.027 |
| Starch C | Oxidative | 0.018 |

Examples 1-6 illustrate the preparation of cationic starch graft copolymers crosslinked according to the invention. Examples 7-14 illustrate the two-stage process according to the invention for the preparation of cationic starch graft copolymers which are likewise according to the invention.

Example 1

1 007 g of demineralized water are initially introduced at room temperature into a 2 l plane-ground flask having jacket heating and a stirrer, and 50.5 g of starch A (solids content 82.2%) are suspended therein with stirring. The apparatus is then placed under nitrogen. Nitrogen atmosphere and stirring are maintained for the entire further reaction sequence.

The starch suspension is heated to 85° C., the starch glutenizing and forming a slightly turbid solution. After 85° C. have been reached, stirring is continued for 15 min and then 0.5 g of glacial acetic acid is added. Thereafter, the following two solutions are metered in uniformly and simultaneously over 90 min at 85° C.:

Feed 1): Aqueous solution of the monomers consisting of:
- 78.2 g of acrylamide
- 23.35 g of 2-(acryloyloxyethyl)trimethylammonium chloride as an 80% strength aqueous solution (AETAC)
- 3.0 g of a 1% strength aqueous solution of N,N'-methylenebisacrylamide (MBA)
- 100.0 g of demineralized water Feed 2): Aqueous solution of the initiator, consisting of:
- 96.9 g of a 2% strength aqueous solution of ammonium peroxodisulphate After the end of the metering operations, stirring is continued for 45 min at 85° C., after which 15.0 g of a 2% strength aqueous solution of ammonium peroxodisulphate are added for subsequent activation. Stirring is effected for a further 45 min at 85° C., after which the polymer solution is cooled to room temperature.

The pH is adjusted to 7.1 with about 7 g of 10% strength sodium hydroxide solution, and furthermore 1.4 g of a biocide (PREVENTOL® D 2, Bayer AG) are added. Finally, the polymer solution is filtered through a 100 μm polyamide filter cloth.

A moderately viscous, clear, homogeneous polymer solution is obtained.

Example 2

The procedure is as in example 1, but other amounts of initially introduced water and N,N'-methylenebisacrylamide are used:

| | |
|---|---|
| Initially introduced demineralized water | 995.0 g |
| 1% strength aqueous solution of MBA | 15.0 g |

Example 3

The procedure is as in example 1, but 50.7 g of the starch B (81.9% solids content) are used.

Example 4

The procedure is as in example 2, but 50.7 g of the starch B (81.9% solids content) are used.

Example 5

The procedure is as in example 1, but 48.5 g of the starch C (85.6% solids content) are used. In contrast to example 1, 1 009 g of demineralized water are initially introduced.

Example 6

The procedure is as in example 2, but 48.5 g of the starch C (85.6% solids content) are used. In contrast to example 2, 997 g of demineralized water are initially introduced.

Example 7

1 031 g of demineralized water are initially introduced into a 2 l plane-ground flask having jacket heating and a stirrer at room temperature, and 49.9 g of the starch A (solids content 83.1%) are suspended therein with stirring. The apparatus is then placed under nitrogen. Nitrogen atmosphere and stirring are maintained for the entire further reaction sequence.

The starch suspension is heated to 85° C., the starch glutenizing and forming a slightly turbid solution. After 85° C. have been reached, stirring is continued for 15 min, after which 0.5 g of glacial acetic acid and 23.4 g of an 80% strength aqueous solution of AETAC are added. For initiation of the 1st polymerization stage, the following solution is metered in uniformly over 30 min at 85° C.:

Feed 1): Aqueous initiator solution consisting of:
   24.2 g of a 2% strength solution of ammonium peroxodisulphate After completion of feed 1, the 2nd polymerization stage is carried out. For this purpose, the following solutions are metered in uniformly over 90 min at 85° C.:

Feed 2): Aqueous acrylamide solution consisting of:
   78.2 g of acrylamide
   80.0 g of demineralized water Feed 3): Aqueous initiator solution consisting of:
   72.7 g of a 2% strength solution of ammonium peroxodisulphate After the end of the metering operations, stirring is continued for 45 min at 85° C., after which 15.0 g of a 2% strength aqueous solution of ammonium peroxodisulphate are added for subsequent activation. Stirring is effected for a further 45 min at 85° C., after which the polymer solution is cooled to room temperature.

The pH is adjusted to 7.1 with about 7 g of 10% strength sodium hydroxide solution and furthermore 1.4 g of the biocide PREVENTOL® D 2 (Bayer AG) are added. Finally, the polymer solution is filtered through a 100 μm polyamide filter cloth.

A slightly viscous, clear, homogeneous polymer solution is obtained.

Example 8

The procedure is analogous to example 7, but a metering time of 60 min is chosen for feed 1 and a metering time of 60 min for the simultaneous feeds 2 and 3.

Example 9

The procedure is analogous to example 7, but the solution of AETAC is metered uniformly and simultaneously with feed 1 over 30 min.

Example 10

The procedure is analogous to example 7, but a different composition of the polymer is chosen. Specifically, in contrast to example 7, the following amounts are used:

| | |
|---|---|
| Starch A (solids content 83.1%) | 66.6 g |
| Demineralized water (initially introduced) | 1049 g |
| AETAC as 80% strength aqueous solution | 13.0 g |
| Feed 1 | 20.8 g |
| Feed 2: | |
| Acrylamide | 72.65 g |
| Demineralized water | 75.0 g |
| Feed 3 | 62.3 g |

Example 11

The procedure is analogous to example 7, but the starch B is used. In contrast to example 7, the following amounts are used:

| | |
|---|---|
| Starch B (solids content 81.9%) | 50.7 g |
| Demineralized water (initially introduced) | 1030 g |

For a sample taken after the end of the 1st polymerization stage, a monomer conversion of 62% was determined by means of $^1$H-NMR.

Example 12

The procedure is analogous to example 7, but the starch C is used. In contrast to example 7, the following amounts are used:

| | |
|---|---|
| Starch C (solids content 85.6%) | 48.5 g |
| Demineralized water (initially introduced) | 1032 g |

Example 13

826 g of demineralized water are initially introduced at room temperature into a 2 l plane-ground flask having jacket heating and a stirrer, and 101.3 g of starch B (solids content 81.9%) are suspended therein with stirring. The apparatus is then placed under nitrogen. Nitrogen atmosphere and stirring are maintained for the entire further reaction sequence.

The starch suspension is heated to 85° C., the starch glutenizing and forming a slightly turbid solution. After 85° C. have been reached, stirring is continued for 15 min and then 0.6 g of glacial acetic acid, 6.0 g of a 5% strength aqueous solution of Rongalit® C (sodium formaldehyde sulphoxylate dihydrate) and 46.7 g of an 80% strength aqueous solution of AETAC are added. For initiation of the 1st polymerization stage, the following solution is metered in uniformly over 30 min at 85° C.:

Feed 1): Aqueous initiator solution consisting of:
    48.5 g of a 2% strength solution of ammonium peroxodisulphate After completion of feed 1, the 2nd polymerization stage is carried out. For this purpose, the following solutions are metered in uniformly over 90 min at 85° C.:

Feed 2): Aqueous acrylamide solution consisting of:
    156.4 g of acrylamide
    165.0 g of demineralized water Feed 3): Aqueous initiator solution consisting of:
    145.3 g of a 2% strength solution of ammonium peroxodisulphate After the end of the metering operations, stirring is continued for 45 min at 85° C., after which 30.0 g of a 2% strength aqueous solution of ammonium peroxodisulphate are added for subsequent activation. Stirring is effected for a further 45 min at 85° C., after which the polymer solution is cooled to room temperature.

The pH is adjusted to 7.0 with about 11 g of 10% strength sodium hydroxide solution, and furthermore 1.6 g of the biocide PREVENTOL® D 2 (Bayer AG) are added. Finally, the polymer solution is filtered through a 100 µm polyamide filter cloth.

A moderately viscous, clear, homogeneous polymer solution is obtained.

Example 14

The procedure is analogous to example 7, but a different composition of the polymer is chosen. Specifically, in contrast to example 7, the following amounts are used:

| | |
|---|---|
| Demineralized water (initially introduced) | 1016 g |
| Feed 2: | |
| Acrylamide | 78.2 g |
| 1% strength aqueous solution of MBA | 15.0 g |
| Demineralized water | 80.0 g |

Example 15

(Comparative Example Analogous to EP-A 194 987) 1 014 g of demineralized water are initially introduced at room temperature into a 2 l plane-ground flask having jacket heating and a stirrer, and 50.5 g of starch A (solids content 82.2%) are suspended therein with stirring. The apparatus is then placed under nitrogen. Nitrogen atmosphere and stirring are maintained for the entire further reaction sequence.

The starch suspension is heated to 85° C., the starch glutenizing and forming a slightly turbid solution. After 85° C. have been reached, stirring is continued for 15 min and then 0.5 g of glacial acetic acid is added. Thereafter, the following two solutions are metered in uniformly and simultaneously over 90 min at 85° C.:

Feed 1): Aqueous solution of the monomers consisting of:
    78.2 g of acrylamide
    23.35 g of AETAC as an 80% strength aqueous solution (AETAC)
    100.0 g of demineralized water Feed 2): Aqueous solution of the initiator, consisting of:
    96.9 g of a 2% strength aqueous solution of ammonium peroxodisulphate After the end of the metering operations, stirring is continued for 45 min at 85° C., after which 15.0 g of a 2% strength aqueous solution of ammonium peroxodisulphate are added for subsequent activation. Stirring is effected for a further 45 min at 85° C., after which the polymer solution is cooled to room temperature.

The pH is adjusted to 7.1 with about 7 g of 10% strength sodium hydroxide solution, and furthermore 1.4 g of the biocide PREVENTOL® D 2 (Bayer AG) are added. Finally, the polymer solution is filtered through a 100 µm polyamide filter cloth.

A moderately viscous, clear, homogeneous polymer solution is obtained.

TABLE 1

Physical parameters of the polymer solutions of examples 1-15

| Example | pH established | Solids content (%) | Viscosity* at 23° C. (mPa · s) |
|---|---|---|---|
| 1 | 7.1 | 10.3 | 390 |
| 2 | 7.3 | 10.2 | 90 |
| 3 | 7.1 | 10.3 | 120 |
| 4 | 7.1 | 10.3 | 100 |
| 5 | 7.0 | 10.0 | 60 |
| 6 | 7.0 | 10.2 | 3000 |
| 7 | 7.1 | 10.0 | 20 |
| 8 | 7.0 | 10.0 | 25 |
| 9 | 7.0 | 9.9 | 20 |
| 10 | 7.1 | 10.1 | 90 |
| 11 | 7.0 | 9.9 | 10 |
| 12 | 7.0 | 9.9 | 20 |
| 13 | 7.0 | 18.1 | 260 |
| 14 | 7.0 | 10.0 | 20 |
| 15 | 7.1 | 10.3 | 150 |

*measured using a Haake VT 5L rotational viscometer (L3 spindle)

USE EXAMPLES (The stated amounts in the following examples are specified as percentages by weight, unless stated otherwise. All stated amounts represent the content of dry polymer, based on dry paper.)

0.5% or 1.5% of each of the polymers from the preceding preparation examples were added with stirring to a wastepaper-containing stock suspension having a consistency of about 5 g/l, prepared from rebeaten, CaCO$_3$-containing lining cardboard. After a mixing time of 2.5 minutes, 0.2% of a retention aid (RETAMINOL E, Bayer AG) was added. After a further mixing time of 10 s, sheets were formed using a Rapid-Koethen laboratory sheet former. These were dried for 7 min in the connected dryer and then conditioned overnight at 23° C. and 50% relative humidity. The ash content of the laboratory sheets without polymer addition, determined by ashing at about 900° C., was 11-13%. The basis weights of the sheets formed were in the range 65-85 μm$^2$.

The sheets thus formed were measured with regard to dry tensile strength using an apparatus from Frank and with regard to the bursting strength using an apparatus from Lorentzen & Wettre. From these data, the relative increase in the dry tensile strength and in the bursting strength was calculated, relative to a comparative sample without addition of a corresponding dry strength agent. The following formula, which is shown here by way of example for the dry tensile strength, was used for the calculation:

$$\text{Relative increase in the dry tensile strength} = \Delta \, DTS = \frac{(SDTS_{Test\,sample} - SDTS_{Zero\,sample})}{SDTS_{Zero\,sample}} \cdot 100 \, [\%]$$

where:
SDTS=Standardized dry tensile strength in N
Zero sample=Laboratory sheet without dry strength agent
Test sample=Laboratory sheet with dry strength agent to be tested All measured values of the dry tensile strength and of the bursting strength were based on a basis weight of 80 g/m$^2$, with the result that the standardized dry tensile strength was calculated from the measured dry tensile strength:

$$\text{Standardized dry tensile strength} = SDTS = \frac{(DTS \cdot BW)}{80}$$

where:
DTS=Measured value of the dry tensile strength
BW=Basis weight of the associated laboratory sheet in g/m$^2$ Analogous procedures were used for calculating the standardized bursting strength or the relative increase in the bursting strength.

The values for the relative increase in the dry tensile strength (Δ DTS) or the relative increase in the bursting strength (Δ BS) are listed in table 2.

TABLE 2

Strength parameters of papers which were treated with polymer solutions from examples 1-15

| Example | Added amount (%) | Δ DTS (%) | Δ BS (%) |
|---|---|---|---|
| 1 | 0.5 | 6.3 | 24.5 |
|   | 1.5 | 20.7 | 40.1 |
| 2 | 0.5 | 9.8 | 25.0 |
|   | 1.5 | 22.5 | 36.6 |
| 3 | 0.5 | 7.7 | 16.5 |
|   | 1.5 | 21.6 | 30.1 |
| 4 | 0.5 | 3.9 | 21.2 |
|   | 1.5 | 19.7 | 35.8 |
| 5 | 0.5 | 6.3 | 19.9 |
|   | 1.5 | 22.8 | 32.2 |
| 6 | 0.5 | 17.4 | 18.5 |
|   | 1.5 | 20.7 | 35.3 |
| 7 | 0.5 | 11.4 | 22.9 |
|   | 1.5 | 30.9 | 40.5 |
| 8 | 0.5 | 17.9 | 26.6 |
|   | 1.5 | 34.6 | 37.9 |
| 9 | 0.5 | 16.3 | 17.6 |
|   | 1.5 | 30.2 | 35.9 |
| 10 | 0.5 | 10.7 | 23.4 |
|    | 1.5 | 18.5 | 32.4 |
| 11 | 0.5 | 25.0 | 27.6 |
|    | 1.5 | 23.2 | 39.6 |
| 12 | 0.5 | 17.0 | 18.7 |
|    | 1.5 | 34.4 | 44.5 |
| 13 | 0.5 | 13.8 | 19.4 |
|    | 1.5 | 15.0 | 34.6 |
| 14 | 0.5 | 16.1 | 25.4 |
|    | 1.5 | 21.2 | 39.3 |
| 15 | 0.5 | −0.2 | 11.3 |
|    | 1.5 | 13.1 | 29.8 |

Both the use of a crosslinking agent (examples 1-6) and the use of the two-stage process according to the invention (examples 7-14) lead, when the same amounts are used, to higher strength parameters compared with the polymer solutions (example 15) known from the prior art.

The following preparation examples 16-20 show further possibilities for the preparation of the polymers according to the invention and for carrying out the processes according to the invention. In all cases, polymer solutions which likewise increased the dry strength of paper in a very good manner in pulp or surface applications were obtained.

Example 16

The procedure is as in example 1, but in contrast the starch C (solids content 85.6%) and acrylic acid are used as further monomer in feed 1. The amounts used are as follows:

| | |
|---|---|
| Starch C | 48.5 g |
| Demineralized water (initially introduced) | 995 g |

Feed 1): Aqueous solution of the monomers consisting of:
74.7 g of acrylamide
23.35 g of AETAC as 80% strength aqueous solution
3.5 g of acrylic acid.
3.0 g of a 1% strength aqueous solution of MBA
100.0 g of demineralized water

| | |
|---|---|
| 10% strength sodium hydroxide solution | 22.0 g |

A clear, homogeneous polymer solution having a pH of 5.3, a solids content of 10.3% and a viscosity of 2 390 mPa.s is obtained.

Example 17

1 005 g of demineralized water are initially introduced at room temperature into a 2 l plane-ground flask having jacket heating and a stirrer, and 49.9 g of starch A (solids content 83.1%) are suspended therein with stirring. The apparatus is then placed under nitrogen. Nitrogen atmosphere and stirring are maintained for the entire further reaction sequence.

The starch suspension is heated to 85° C., the starch glutenizing and forming a slightly turbid solution. After 85° C. have been reached, stirring is continued for 15 min and then 2.0 g of glacial acetic acid and 0.65 g of sodium formaldehyde sulphoxylate dihydrate are added. Thereafter, the following two solutions are metered in uniformly and simultaneously over 90 min at 85° C.:

Feed 1): Aqueous solution of the monomers consisting of:
  78.2 g of acrylamide
  23:35 g of diallyldimethylammonium chloride as an 80% strength aqueous solution
  3.0 g of a 1% strength aqueous solution of MBA
  100.0 g of demineralized water
Feed 2): Aqueous solution of the initiator, consisting of:
  96.9 g of a 2% strength aqueous solution of ammonium peroxodisulphate After the end of the metering operations, stirring is continued for 45 min at 85° C., after which 15.0 g of a 2% strength aqueous solution of ammonium peroxodisulphate are added for subsequent activation. Stirring is effected for a further 45 min at 85° C., after which the polymer solution is cooled to room temperature.

The pH is adjusted to 7.1 with about 14 g of 10% strength sodium hydroxide solution, and furthermore 1.4 g of the biocide PREVENTOL® D 2 (Bayer AG) are added. Finally, the polymer solution is filtered through a 100 μm polyamide filter cloth.

A clear, homogeneous polymer solution having a solids content of 10.0% and a viscosity of 10 mPa.s is obtained.

Example 18

The procedure is analogous to example 1 but, instead of MBA, ethylene glycol dimethacrylate is used as a crosslinking agent in feed 1. In contrast to example 1, the following amounts are used:

| | |
|---|---|
| Starch A (solids content 83.1%) | 49.9 g |
| Demineralized water (initially introduced) | 995 g |
| 1% strength aqueous emulsion of ethylene glycol dimethacrylate (emulsified by addition of 0.1% of Na dodecylsulphate) | 15.0 g |

A clear, homogeneous polymer solution having a pH of 7.1, a solids content of 10.2% and a viscosity of 120 mPa.s is obtained.

Example 19

The procedure is analogous to example 7, but a different composition of the polymer is chosen. Specifically, in contrast to example 7, the following amounts are used:

| Feed 2: | |
|---|---|
| Acrylamide | 73.4 g |
| Acrylic acid | 4.8 g |
| Demineralized water | 80.0 g |
| 10% strength NaOH | about 30 g |

A clear, homogeneous polymer solution having a pH of 7.0, a solids content of 9.8% and a viscosity of 25 mPa.s is obtained.

Example 20

1 022 g of demineralized water are initially introduced at room temperature into a 2 l plane-ground flask having jacket heating and a stirrer, and 49.9 g of starch A (solids content 83.1%) are suspended therein with stirring. The apparatus is then placed under nitrogen. Nitrogen atmosphere and stirring are maintained for the entire further reaction sequence.

The starch suspension is heated to 85° C., the starch glutenizing and forming a slightly turbid solution. After 85° C. have been reached, stirring is continued for 15 min and then 0.5 g of glacial acetic acid, 0.15 g of Rongalit® C (sodium formaldehyde sulphoxylate dihydrate) and 25.6 g of a 65% strength aqueous solution of diallyldimethylammonium chloride are added. For initiation of the 1 st polymerization stage, the following solution is metered in uniformly over 30 min at 85° C.:

Feed 1): Aqueous initiator solution consisting of:
  24.2 g of a 2% strength aqueous solution of ammonium peroxodisulphate After completion of feed 1, the 2nd polymerization stage is carried out. For this purpose, the following solutions are metered in uniformly over 90 min at 85° C.:

Feed 2): Aqueous acrylamide solution consisting of:
  80.3 g of acrylamide
  85.0 g of demineralized water
Feed 3): Aqueous initiator solution consisting of:
  72.7 g of a 2% strength solution of ammonium peroxodisulphate After the end of the metering operations, stirring is continued for 45 min at 85° C., after which 15.0 g of a 2% strength aqueous solution of ammonium peroxodisulphate are added for subsequent activation. Stirring is effected for a further 45 min at 85° C., after which the polymer solution is cooled to room temperature.

The pH is adjusted to 7.0 with about 6 g of 10% strength sodium hydroxide solution, and furthermore 1.4 g of the biocide PREVENTOL® D 2 (Bayer AG) are added. Finally, the polymer solution is filtered through a 100 μm polyamide filter cloth.

A clear, homogeneous polymer solution having a pH of 7.0, a solids content of 10.0% and a viscosity of 10 mPa.s is obtained.

The invention claimed is:

1. Cationic starch graft polymer composed of the monomers a) to d)
   a) 20- 80% by weight of acrylamide, methacrylamide or mixtures thereof,
   b) 3- 20% by weight of at least one basic or cationic vinyl monomer,
   c) 0.005- 1.5% by weight of at least one bifunctional or higher-functional crosslinking agent,
   d) 0- 10% by weight of at least one nonionic or anionic vinyl monomer which differs from the monomers mentioned under a) to c)
and a grafting base e)
   e) 15- 70% by weight of at least one starch whose molecular weight has been reduced by partial degradation,
   the sum of a) to e) being 100% by weight; wherein the cationic starch graft polymer can form a 5 to 25 percent by weight solution in water at 23° C.; and
wherein the cationic starch graft polymer is a product of a process comprising a first step comprising free radical polymerization of grafting base e) in water with at least 30% by weight of the total amount of component b) to form a reaction mixture, and a second step comprising free radical polymerization of components a), c), d), and any remaining amount of component b) in the presence of the reaction mixture.

2. Cationic starch graft polymer according to claim 1, wherein component a) is acrylamide.

3. Cationic starch graft polymer according to claim 1, wherein component b) is a vinyl compound which has a double bond capable of free radical polymerization and which contains either a permanently cationic charge or a basic group which is present in completely or partly protonated form under weakly acidic conditions.

4. Cationic starch graft polymer according to claim 1, wherein monomer c) is a water-soluble (i.e.>3 g/l at 23° C.) divinyl compound.

5. Cationic starch graft polymer according to claim 1, wherein the starch is additionally derivatized.

6. Cationic starch graft polymer according to claim 1, wherein the starch is a cationic starch.

* * * * *